United States Patent [19]

Tegeler et al.

[11] Patent Number: 5,431,111
[45] Date of Patent: Jul. 11, 1995

[54] RAILBORNE VEHICLE

[75] Inventors: Ferdinand Tegeler; Arne Kühnel, both of Berlin, Germany

[73] Assignee: ABB Henschel Waggon Union GmbH, Berlin, Germany

[21] Appl. No.: 158,615

[22] Filed: Nov. 29, 1993

[30] Foreign Application Priority Data

Nov. 27, 1992 [DE] Germany .................. 42 39 882.7

[51] Int. Cl.⁶ ............................................. B61D 17/00
[52] U.S. Cl. .................................... 105/397; 105/401
[58] Field of Search ............... 105/396, 397, 398, 401, 105/402, 403, 404, 406.1, 409, 410, 3, 238.1, 329.1

[56] References Cited

U.S. PATENT DOCUMENTS 1,035,216  8/1912  McNulta ............................. 105/398
1,094,444  4/1914  Johnson ............................. 105/398

FOREIGN PATENT DOCUMENTS 0534928  12/1956  Canada ............................. 105/397
0483376  12/1951  Italy ............................... 105/397

Primary Examiner—Mark T. Le
Attorney, Agent, or Firm—Herbert L. Lerner; Laurence A. Greenberg

[57] ABSTRACT

A railborne vehicle, in particular a passenger car, includes an underframe with a trough-like bottom. A car body is disposed on the underframe and has end surfaces, truck regions each being spaced apart from a respective one of the end surfaces, a middle region disposed between the truck regions, end regions each tapering from a respective one of the truck regions to a respective one of the end surfaces, a roof, and a cross section with polygonal long sides and a width being increased from the end surfaces to the truck regions and being narrowed at the middle region. A truck is disposed in each respective one of the truck regions.

12 Claims, 6 Drawing Sheets

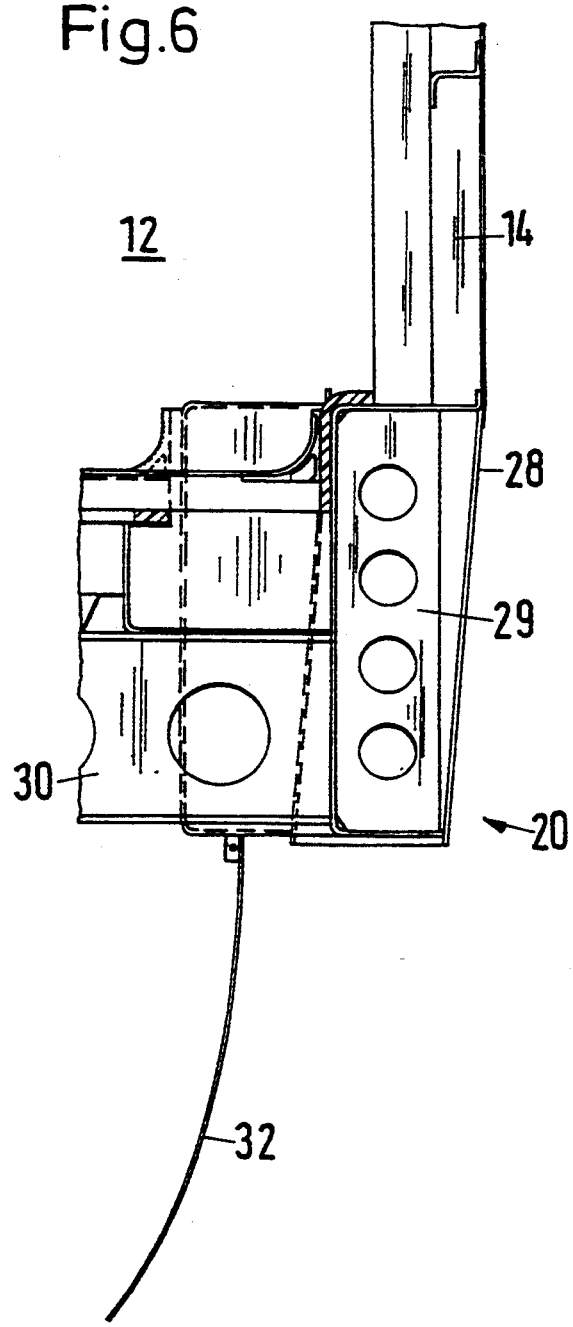

RAILBORNE VEHICLE

BACKGROUND OF THE INVENTION

FIELD OF THE INVENTION

The invention relates to a railborne or track vehicle, in particular a passenger car, having a car body disposed on an underframe with a trough-like bottom, two trucks each being disposed at a distance from an end surface in a truck region, a middle region disposed between the truck regions, end regions each tapering from one of the truck regions to one of the end surfaces, and a roof.

In rail-bound vehicles it has long been known, particularly for railway passenger cars as well as for streetcars, to reduce the width of the end regions of the vehicles relative to the middle region, or at least to taper them toward the end surfaces, in order to keep the free overhang of the car body within a specified structure gauge or clearance in curves and turns. The structure gauge or clearance is a clearance which is measured from the track outward, that must not be exceeded on all sides so as to reliably preclude possible collisions in multiple-track operation or in tight spaces, for instance.

Previously, the width of the cars, known as the car body width, was selected for the narrowest point of the inner limitation in the tightest curve or turn to be traversed. That means that in conventional vehicles, the maximum allowable car body width for the structure clearance cannot be made use of, since the outward swing of the car body presents an inner or outer limitation in curves and turns. In other words, in order not to exceed the boundary specified by the structure clearance, the car body width must be narrower than the maximum allowable width on a straightaway, so that even in turns, the specified boundary clearance will be adhered to.

Such a structure necessarily lessens the possible space available for the car body on the straightaway.

SUMMARY OF THE INVENTION

It is accordingly an object of the invention to provide a railborne vehicle, which overcomes the hereinaforementioned disadvantages of the heretofore-known devices of this general type and which does so in such a way that the available space in each car is increased while still meeting the peripheral conditions resulting from the specified structure clearance.

With the foregoing and other objects in view there is provided, in accordance with the invention, a railborne vehicle, comprising an underframe with a trough-like bottom; a car body being disposed on the underframe and having end surfaces, truck regions each being spaced apart from a respective one of the end surfaces, a middle region disposed between the truck regions, end regions each tapering from a respective one of the truck regions to a respective one of the end surfaces, a roof, and an outline or cross or horizontal section with polygonal long sides and a width being increased from the end surfaces to the truck regions and being narrowed at the middle region; and two trucks each being disposed in a respective one of the truck regions.

Through the use of this kind of configuration, which is shaped somewhat like a bone in a projected view, namely with two widened portions near the end and a slenderer middle region that joins these widened portions, the requirements made by the specification of the structure clearance can be met, and at the same time the available space can be increased by approximately 7% as compared with conventional railway cars.

While heretofore the construction of railborne vehicles only took the overhang of the end region into account, with the result being a structure with tapered ends, until now the region located between the ends had been constructed with long sides being parallel to one another, to obtain the maximum amount of car body width in view of the peripheral conditions explained above. The invention now provides that the maximum amount for the width of the car body be specified from the structure clearance in the truck regions, and that the middle region located between them be made slenderer, or in other words provided with a lesser width, and in that way be adapted to the course of the limiting curve.

As a result, the car body has the previously conventional width in the middle, or in other words halfway along its length, while toward the truck regions it widens to a larger car width.

As already mentioned, the area of the base of the car body can be markedly increased in this manner, so that in passenger trains, for instance, additional seats can be installed without any sacrifice in comfort or in terms of safety-related regulations.

In accordance with another feature of the invention, the cross section or outline has long sides constructed symmetrically with respect to one another, and the truck regions on both sides of the middle region have the same outer contour. Therefore, in accordance with a further feature of the invention, the side walls of the car body follow the polygonal contour of the long sides of the cross section or outline.

In accordance with an added feature of the invention, the car body has a maximum allowable width in the truck region, the width results from the specified structure clearance, and has a different, lesser minimum width in the middle region, which is equivalent to what was heretofore the maximum width, as already noted.

In accordance with an additional feature of the invention, the joining of the side walls of the car body to the vehicle roof is carried out in a curved region; and the width of the roof is adapted to the aforementioned defined minimum width of the car body in the middle region and is constructed to be rectilinearly continuous. Resultant interstices between the roof and the side walls resulting from the differences in width are spanned by means of suitably constructed upper flanges, which are mounted on the side walls. This has the advantage of permitting the roof to be prefabricated as a standard component. The changes in width advantageously follow the outline harmonically.

In other words, in accordance with yet another feature of the invention, the side walls of the car body, which are preferably formed of individual side wall elements and have a variable spacing from the corresponding side wall element on the opposite long side of the car body, depending on their configuration, have a gradual, virtually discontinuity-free transition from the maximum width to the minimum width, and vice versa.

In accordance with yet a further feature of the invention, the trucks are constructed as pivoted trucks and have pivot pins at a distance of approximately 15% of the total length of the vehicle, as measured from the end surface in each case. This provides a special advantage both for the size of the truck region having the maximum width and for the defined minimum width of the center region, because its limitation in curves or turns becomes less as a result.

In accordance with yet an added feature of the invention, the underframe has outer sole bars being divided in accordance with the side wall elements and disposed so as to run in the same direction as the wall elements. The connection of the outer sole bars to the bottom trough is effected by means of crossbars of variable lengths to suit the particular car body width. This means that the bottom trough of the car body continues to be constructed in the usual way, so that no change in the devices and equipment to be disposed on the bottom trough is required.

The outer sole bars for forming the underframe are constructed as J profiles, with local bends to match the course of the side walls. The forces that arise are absorbed by the crossbars.

In accordance with a concomitant feature of the invention, in order to join the side walls to the roof, there are provided top flanges which are divided in accordance with the side wall elements and are connected to the roof by corresponding roof overlaps being adapted to it in width. This affords the possibility of making the roof rectilinearly continuous in the form of a prefabricated component. Differences in width resulting from the polygonal course of the side walls are compensated for by means of the top flanges mounted on the side walls.

Other features which are considered as characteristic for the invention are set forth in the appended claims.

Although the invention is illustrated and described herein as embodied in a railborne vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a fragmentary, longitudinal-sectional view of a sole bar halfway along the length of the vehicle.

DESCRIPTION OF THE PREFERRED EMBODIMENTS

Figure 1:
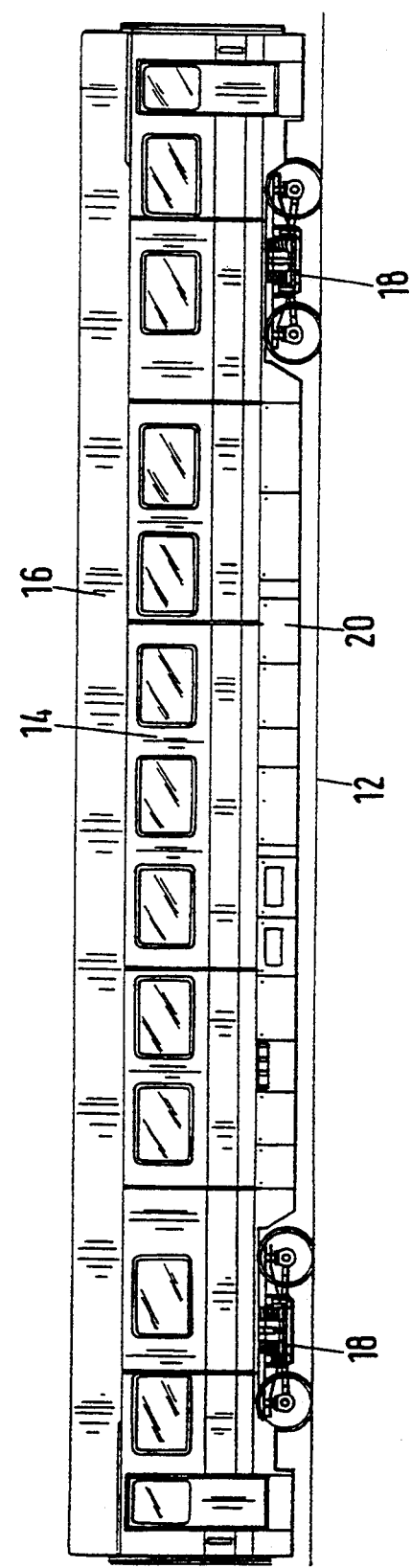
FIG. 1 is a diagrammatic, side-elevational view of a vehicle according to the invention.

Referring now to the figures of the drawing in detail and first, particularly, to FIG. 1 thereof, there is seen a railborne or track vehicle 10, namely a car for a passenger train, which has a car body 12 with side walls 14, a roof 16, and two trucks 18 constructed as pivoting trucks. An underframe 20 to which the trucks 18 are joined by pivot pins of the trucks is disposed beneath the car body 12. The pivot pins are diagrammatically illustrated as intersections of dot-dash lines Z and a longitudinal center line of the vehicle 10 which is also shown in dot-dash lines, as is seen in FIG. 2.

Figure 2:
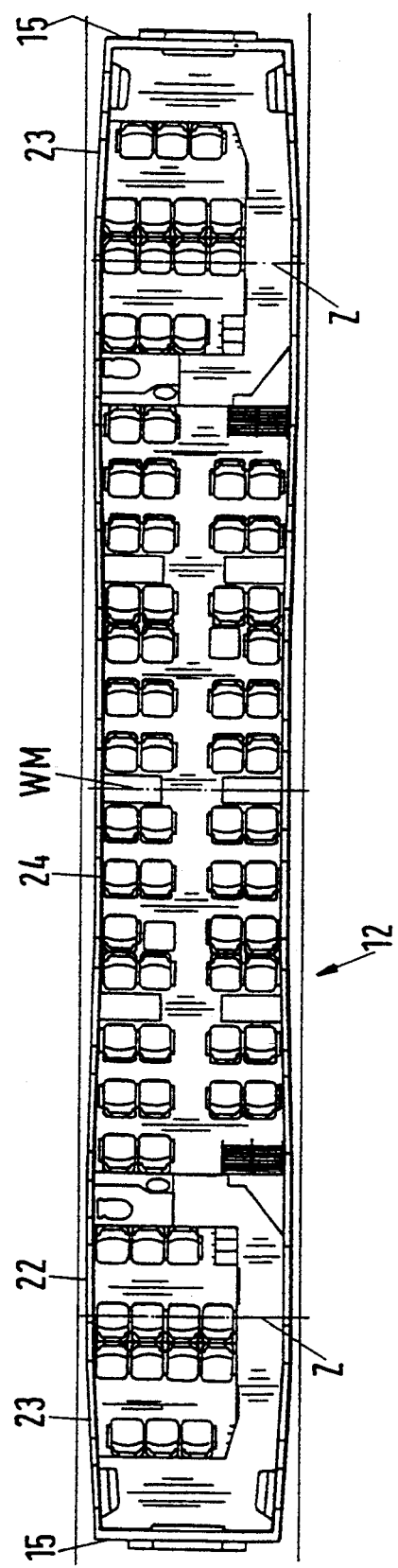
FIG. 2 is a cross-sectional view of the vehicle of FIG. 1.

As is seen particularly from the illustration in FIG. 2 showing an outline or a cross-sectional or horizontal-sectional view of the vehicle 10 of FIG. 1, the side walls 14 have a polygonal course or shape. Beginning at one end surface 15, the side wall 14 first continues outward, as viewed in the longitudinal direction, and has a maximum spacing from the longitudinal center line of the car body 12 in a truck region 22. From this maximum width in the truck region 22 of the car body 12, the side wall 14 runs inward again and changes or merges into a middle region 24 that has a certain minimum width. Beginning at a point at the middle or halfway along the length of the car, which is indicated by a dot-dash line WM, the continued course or shape is correspondingly the reverse of that described above, until the side wall at an opposite end surface 15 again reaches the minimum width of the car body 12. The truck region 22 defines the region of the car body 12 in which the trucks 18 are accommodated. End regions 23 are each tapered from one truck region 22 to one end surfaces 15.

Figure 3:
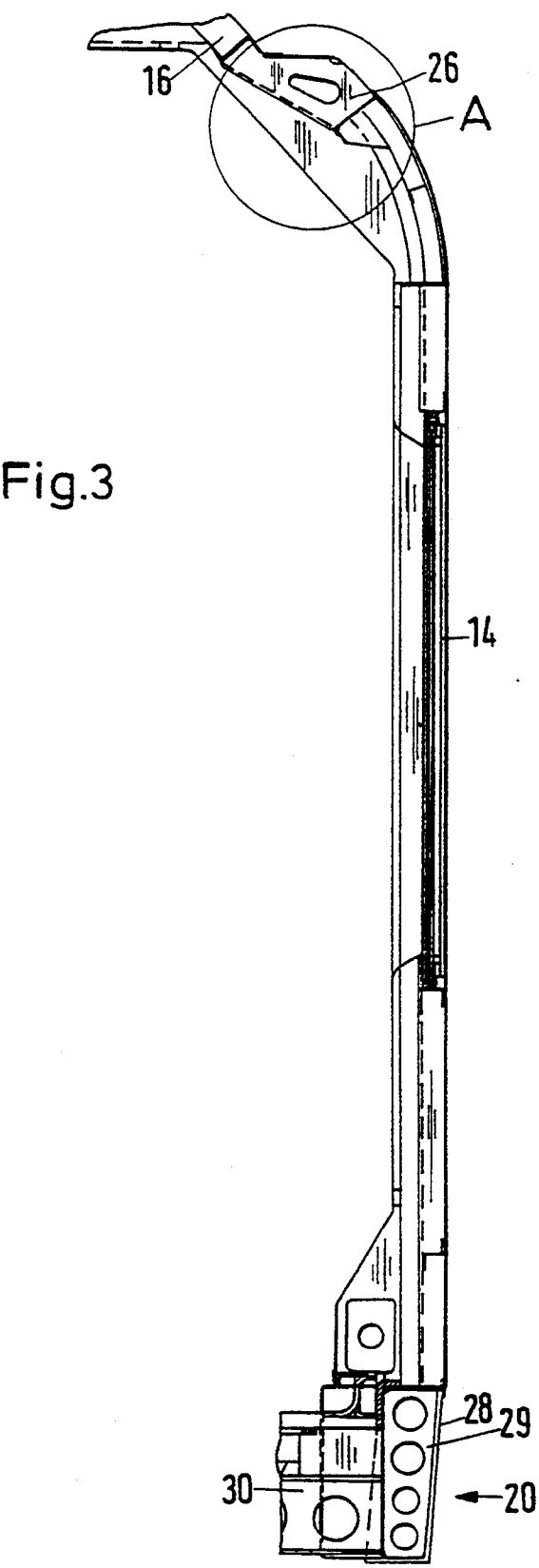
FIG. 3 is a fragmentary, enlarged, longitudinal-sectional view of a side wall.

FIG. 3 shows a longitudinal section through a side wall 14, with a top flange 26 mounted on top that produces a connection between the side wall 14 and the roof 16. In an upper region where it connects with the top flange 26, the side wall 14 has a curvature that is adapted to the roof vaulting.

The side wall 14 is adjoined at the bottom by the underframe 20, with an outer sole bar 28. As can be seen from FIG. 3 in combination with FIG. 2, since outer sole bar 28 follows the polygonal course of the side wall 14 and because of the changes in width of the car body provided, deviations from rectilinearity are unavoidable. In order to enable the forces that accordingly result to be reliably absorbed, the outer sole bars 28 are joined to cross bars 30. In order to increase their rigidity, the outer sole bars 28 are also provided with transverse segments 29, which are perforated for the sake of saving weight.

Figure 4:
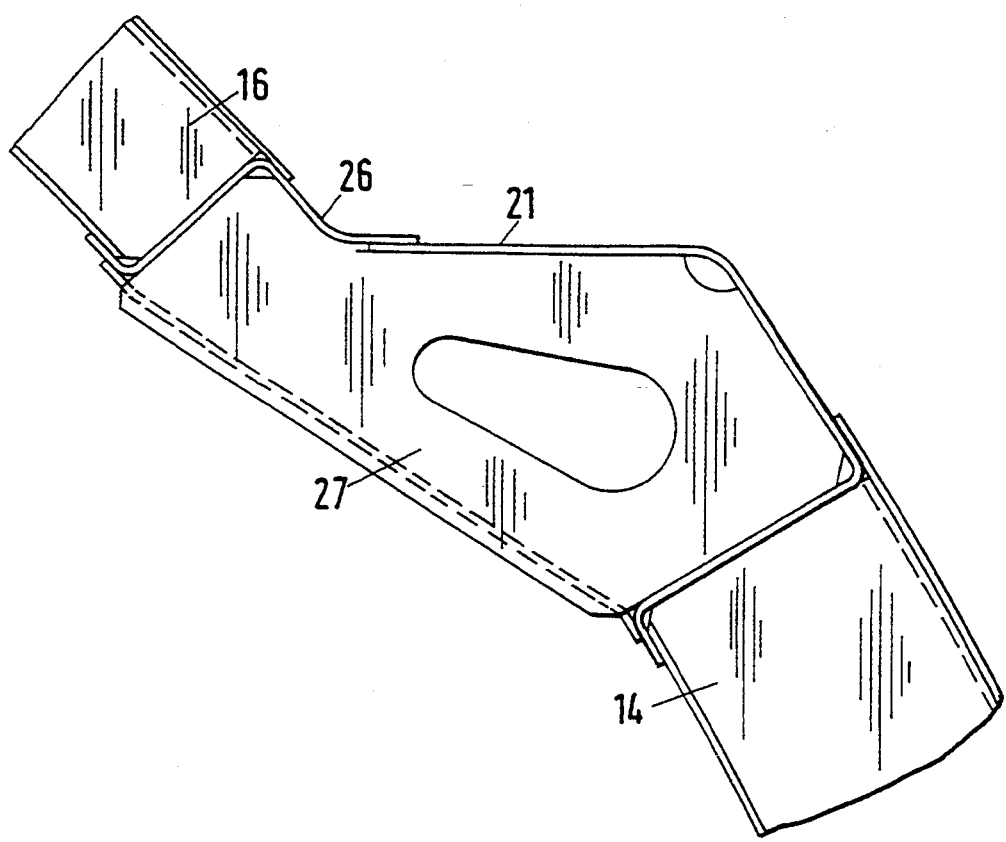
FIG. 4 is a fragmentary, further enlarged, longitudinal-sectional view of a portion indicated by reference numeral A in FIG. 3, through a top flange in the middle of a car.

FIG. 4 shows an enlargement of the portion A of FIG. 3, which illustrates the top flange 26 that is used to join the side wall 14 to the roof 16. In comparison with FIG. 5, which also shows a longitudinal section through the top flange 26, but in the region 23 of the car body 12 instead of at the middle of the car which is indicated by reference symbol WM in FIG. 4, it can be seen that a strut 21 which is disposed on the upper outer surface of the top flange 26 has a variable width, depending on its particular location, namely at the middle or at the end of the car body.

Figure 5:
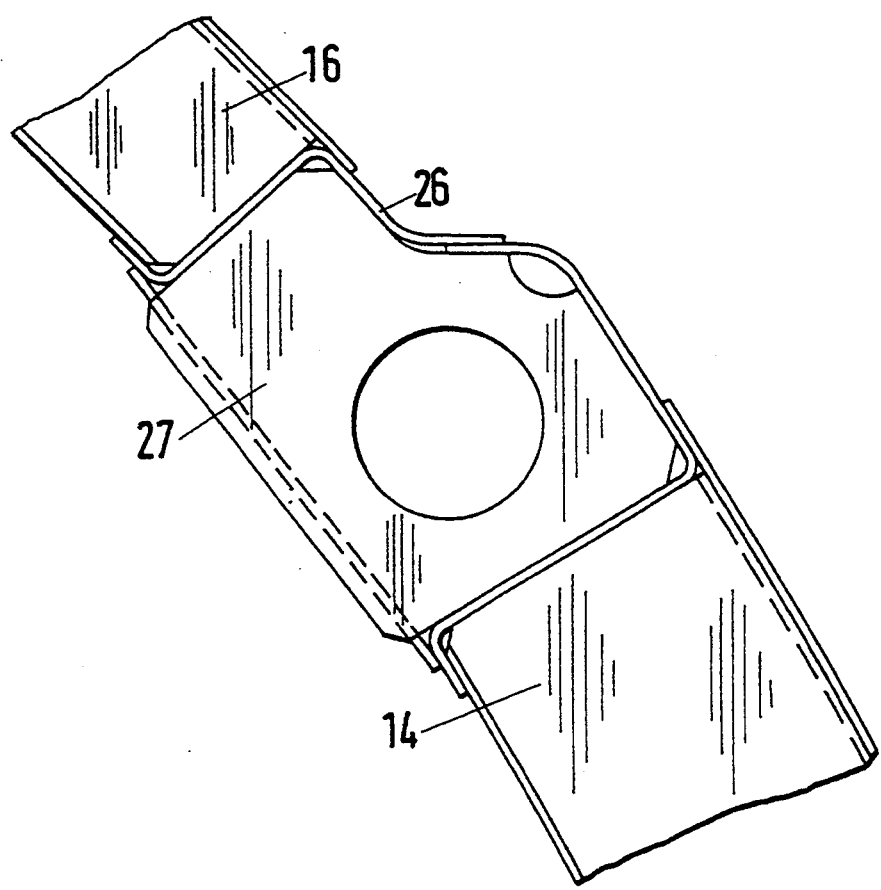
FIG. 5 is a fragmentary, longitudinal-sectional view of a top flange in an end region.

It can be seen from the longitudinal-sectional view of the top flange 26 shown in FIGS. 4 and 5 that this flange is constructed as a sheet-metal profile and is provided with transverse segments 27 in order to make it more rigid. These transverse segments 27 are also perforated, and depending on the requirements, the strut 21 provided on the upper outer surface of the top flange 26 may be constructed to be variously wide, in order to compensate for the difference in width between the roof 16 and the side wall 14.

In FIG. 6, the lower attachment of the side wall 14 of the car body 12 to the underframe 20 is shown. The underframe is essentially supported by the outer sole or wall bar 28. The crossbar 30 which can also be seen, is joined to the outer sole bar 28 and serves to secure a non-illustrated bottom trough of the car body 12 to the underframe 20. The underside or lower surface of the crossbar 30 is adjoined by a lateral cladding 32 that covers the long side of the car on the bottom.

What is claimed is:

1. A railborne vehicle, comprising:

an underframe with a trough-shaped bottom;

a car body disposed on said underframe, said car body having a roof, polygonal side walls, and end surfaces, truck regions each being spaced apart from a respective one of said end surfaces, and a middle region disposed between said truck regions, said side walls each tapering from a respective one of said truck regions to a respective one of said end surfaces, and said side walls tapering from a respective one of said truck regions towards said middle region, and said side walls defining a width of said car body being increased from said end surfaces to said truck regions and being narrowed at said middle region; and two pivoting trucks each being disposed in a respective one of said truck regions.

2. The vehicle according to claim 1, wherein said side walls are constructed symmetrically relative to one another, and said truck regions on both sides of said middle region have the same outer contour.

3. The vehicle according to claim 1, wherein said side walls follow a polygonal contour of said car body.

4. The vehicle according to claim 3, wherein said car body has a maximum allowable width in said truck regions and a different, lesser minimum width in said middle region.

5. The vehicle according to claim 3, including an outer contour with a curved region at which said roof is joined to said side walls.

6. The vehicle according to claim 4, wherein said roof is adapted to said minimum width of said middle region and has rectilinearly continuous long sides, and wherein interstices resulting from differences in width in said truck region between said roof and said side walls are covered.

7. The vehicle according to claim 6, including top flanges and struts being mounted on said side walls for spanning the interstices.

8. The vehicle according to claim 1, wherein said polygonal side walls have a steady course.

9. The vehicle according to claim 1, wherein said car body has a given total length between said end surfaces, and said trucks are pivotal trucks having pivot pins being disposed on said car body and being spaced apart from said end surfaces by approximately 15% of said given total length.

10. The vehicle according to claim 1, wherein said car body has a width being less at said end surfaces than in said middle region.

11. The vehicle according to claim 3, wherein said side walls are formed of individual side wall elements each being disposed at a variable spacing from a corresponding side wall element on an opposite long side of said car body, in accordance with the course of said polygonal contour of said car body.

12. The vehicle according to claim 11, wherein said underframe has outer sole bars being divided in accordance with said side wall elements and being extended in the same direction as said side wall elements.

* * * * *